(12) United States Patent
Millhouse et al.

(10) Patent No.: US 10,319,006 B2
(45) Date of Patent: Jun. 11, 2019

(54) SYSTEM AND METHOD FOR DATABASE QUERIES

(71) Applicant: Wal-Mart Stores, Inc., Bentonville, AR (US)

(72) Inventors: Andrew B. Millhouse, Phoenix, AZ (US); John S. Meredith, Bentonville, AR (US); Leroy Ellis, Bentonville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 15/836,452

(22) Filed: Dec. 8, 2017

(65) Prior Publication Data

US 2018/0189845 A1   Jul. 5, 2018

Related U.S. Application Data

(60) Provisional application No. 62/440,629, filed on Dec. 30, 2016.

(51) Int. Cl.
*G06Q 30/04* (2012.01)
*G06F 16/248* (2019.01)
(Continued)

(52) U.S. Cl.
CPC .......... *G06Q 30/04* (2013.01); *G06F 16/248* (2019.01); *G06F 16/24539* (2019.01); *G06Q 50/28* (2013.01)

(58) Field of Classification Search
CPC .. G06Q 30/04; G06Q 50/28; G06F 17/30457; G06F 17/30554
See application file for complete search history.

(56) References Cited

U.S. PATENT DOCUMENTS 5,383,112 A *  1/1995  Clark ................ G06F 17/30017
                                                   705/28
5,929,421 A   7/1999  Cherry et al.
(Continued)

FOREIGN PATENT DOCUMENTS

WO      2012040820 A1    4/2012

OTHER PUBLICATIONS

"Processing Invoice Claims", Sap.com, accessed Dec. 19, 2016 (3 pp).

(Continued)

*Primary Examiner* — Nathan A Mitchell
(74) *Attorney, Agent, or Firm* — Venable LLP; Jeffri A. Kaminski

(57) ABSTRACT

Retail stores may use the claim processing server to make a claim against a distribution center. Information about the claim may be entered into the store computer via an application and user interface. The claim processing server may use the information to process the claim and validate the related data. Using the information entered via the application the claim processing server may query the item database and the invoice database to retrieve to retrieve addition information from the database regarding the claim and the items. The information from the different databases may be merged together into a single database record which is then validated and stored the claim processing database. The information may also be checked and its accuracy verified. The user interfaces at the retail stores and distribution center may then be used to identify the claims for processing. The information for the item and invoice databases needed to process the claims are available from the claims processing database and the claim may be processed. The claims may be stored in the claims processing database for processing at (Continued)

a later time or for batch processing, for example during off-peak hours.

18 Claims, 4 Drawing Sheets

(51) Int. Cl.
*G06F 16/2453* (2019.01)
*G06Q 50/28* (2012.01)

(56) References Cited

U.S. PATENT DOCUMENTS

| | | | |
|---|---|---|---|
| 6,292,784 B1 | 9/2001 | Martin et al. | |
| 6,826,557 B1* | 11/2004 | Carter | G06F 17/30457 |
| 7,711,612 B1* | 5/2010 | Farias | G06Q 10/06 |
| | | | 704/219 |
| 8,355,947 B2 | 1/2013 | Quinlan et al. | |
| 2001/0021929 A1* | 9/2001 | Lin | G06F 17/30386 |
| 2002/0184121 A1 | 12/2002 | Sijacic et al. | |
| 2003/0074377 A1 | 4/2003 | Gupta et al. | |
| 2003/0130945 A1* | 7/2003 | Force | G06Q 20/102 |
| | | | 705/40 |
| 2004/0019567 A1 | 1/2004 | Herceg et al. | |
| 2005/0289129 A1 | 12/2005 | Schmitt | |
| 2006/0190380 A1* | 8/2006 | Force | G06Q 30/04 |
| | | | 705/35 |
| 2007/0011041 A1* | 1/2007 | Bourne | G06Q 10/06 |
| | | | 340/572.3 |
| 2007/0203876 A1 | 8/2007 | Hoopes et al. | |
| 2007/0239769 A1* | 10/2007 | Fazal | G06F 17/30554 |
| 2008/0133478 A1 | 6/2008 | Weiler et al. | |
| 2008/0172312 A1* | 7/2008 | Synesiou | G06Q 10/00 |
| | | | 705/34 |
| 2009/0018933 A1 | 1/2009 | Drazan et al. | |
| 2009/0043594 A1 | 2/2009 | Tseng | |
| 2009/0228345 A1* | 9/2009 | Ford | G06Q 10/0833 |
| | | | 705/333 |
| 2011/0179048 A1* | 7/2011 | Satlow | G06F 19/328 |
| | | | 707/754 |
| 2012/0123950 A1* | 5/2012 | Gventer | G06Q 10/08 |
| | | | 705/304 |
| 2014/0149269 A1* | 5/2014 | Kantarjiev | G06Q 10/083 |
| | | | 705/34 |
| 2014/0374478 A1* | 12/2014 | Dearing | G06Q 10/0833 |
| | | | 235/385 |
| 2015/0144689 A1 | 5/2015 | Cancro et al. | |
| 2016/0261567 A1 | 9/2016 | Baskaran | |

OTHER PUBLICATIONS

"Oracle Accounts Receivable Deductions Settlement User Guide", Oracle.com, accessed Dec. 19, 2016 (32 pp).
International Search Report and Written Opinion issued in corresponding International Application No. PCT/US2017/065380 dated Feb. 9, 2018 (12 pp).

* cited by examiner

SYSTEM AND METHOD FOR DATABASE QUERIES

BACKGROUND

1. Technical Field

The present disclosure relates to systems and methods to minimize database queries to improve computer system efficiency and operation.

2. Introduction

Many organizations have data stored in different locations and in different databases. Different data may be stored in these different databases. The databases may be the central repositories for the respective different data types used across an organization. As such, many or all of the organization's locations may need access to and to run queries against these databases. In addition, the data required for a task may be stored in disparate ones of the databases. This data must be retrieved from the different databases and merged. To search and retrieve data from these databases requires many different database queries. Moreover even once the data is found, the queries may continue to run as they are structured to search all the available data fields in the databases for the requested data. These scenarios result in the system running slowly, and even becoming overloaded and failing.

SUMMARY

A method comprising receiving via a user application claim information including item identifying information; querying an item database to locate item information corresponding to the item identify information; merging the item identifying information with the item information from the item database to obtain first merged data; temporarily storing the merged data; determining an item number from the merged information; querying an invoice database to retrieve invoice information corresponding to the item number; merging the invoice information with the first merged data to obtain second merged data; and storing the second merged data as a single record for the item in a claims database.

A method comprising receiving via a user application claim information including item identifying information, an impact and a quantity; automatically creating a time/date stamp for the claim information; automatically determining a location for the claim; creating a claim record in a claim database, the claim record including the item identifying information, the impact, the quantity, the time/date stamp and the location; querying an item database to locate item information corresponding to the item identity information; merging the claim record with the item information from the item database to obtain first merged data; determining an item number from the merged data; querying an invoice database to locate invoice information corresponding to the item number; retrieving the invoice information from the invoice database; notifying store when the invoice information is not found; merging the invoice information with the first merged data into one data record; storing the data record a database.

A system, comprising an item database storing an item record including an item, item description, item number; an invoice database storing an invoice record including item number, quantity, price, date shipped, invoice number, and trailer ID; a store computer having a store user application; distribution center computer having a user application; a server; and the claims database, the item database, the invoice database, the store computer, the distribution center computer, and the server connected to a network, the server: receiving via a user application claim information including item identifying information; querying the item database to locate item information corresponding to the item identify information; merging the item identifying information with the item information from the item database to obtain first merged data; temporarily storing the merged data; determining an item number from the merged information; querying the invoice database to retrieve invoice information corresponding to the item number; merging the invoice information with the first merged data to obtain second merged data; and storing the second merged data as a single record for the item in a claims database.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

The disclosed systems, methods, and computer-readable storage mediums improve the efficiency of computers and database systems. Embodiments of the invention improve the operation of the computer system by minimizing the number of queries used to locate the data distributed across different databases. Remaining information required to process a task, such as a claim, may be automatically retrieved and validated. In addition, the queries may cease as soon as the desired data is located. These improvements reduce the operating load on the system and improve the speed and efficiency of data retrieval. In addition, the queries may be scheduled to run at a selected time, for example in the evening or overnight when processing loads are typically lighter, thus improving the operation of the system at other times. Embodiments of the invention are described in more detail below in the context of retail stores, but may be used in any environment where data is stored or distributed in different databases.

Figure 1:
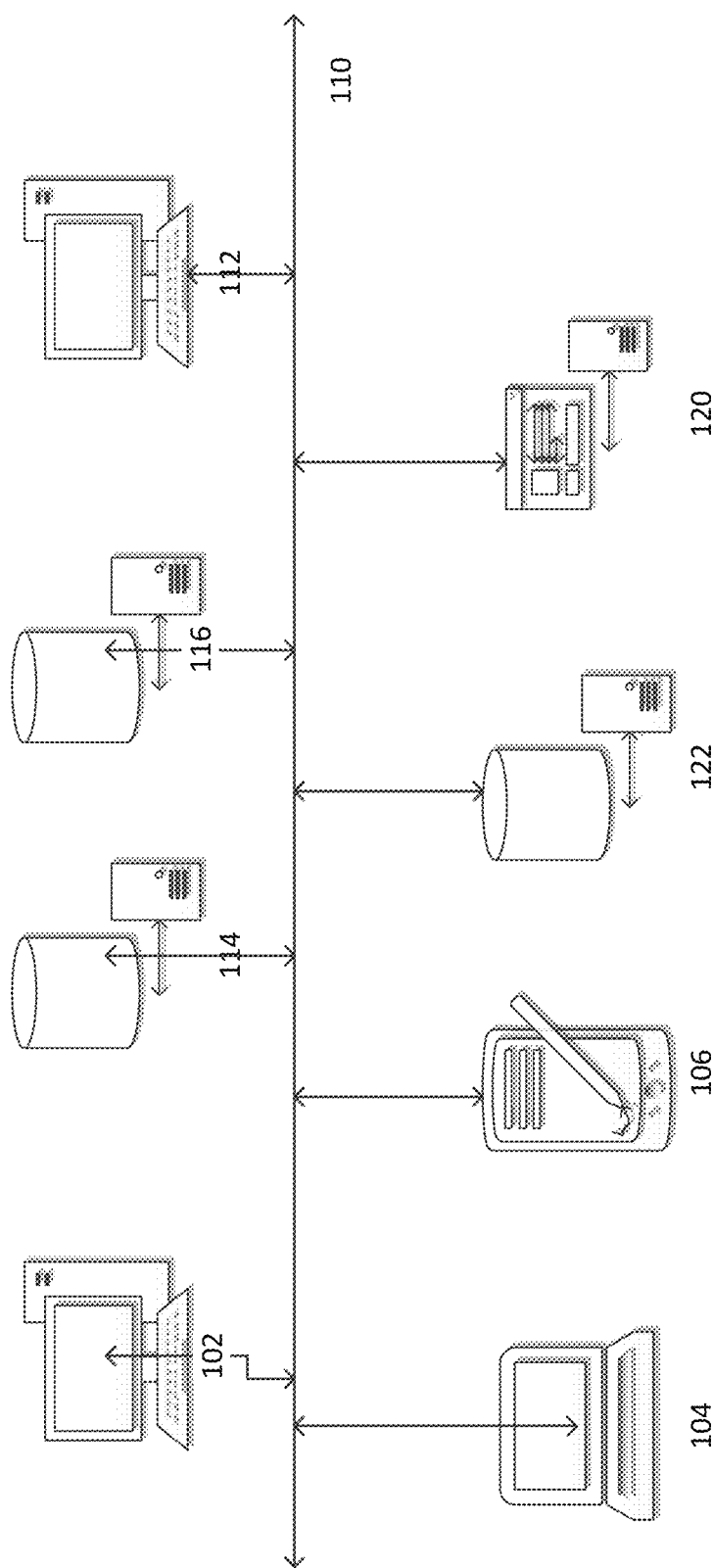
FIG. 1 illustrates an exemplary method according to an embodiment of the invention.

FIG. 1 illustrates an example of a computer system 100. The system 100 may include one or more store computers 102-106. The store computers 102-106 may be located at retail stores in a geographic area. The store computers may include desktop computers, laptops, mobile and handheld computers. The store computers 102-106 are connected to a network 110. One or more distribution center computers 112 may also be connected to the network 110. The distribution center computers 112 may include desktop computers, laptops, mobile and handheld computers. In order to stock and maintain inventory, retail stores may order items from distribution centers. The distribution centers receive and fulfill these orders, sending the requested items to the retail store for subsequent sale to customers. The items may include any type of item, for example, produce, meats, televisions, computers, clothing, etc.

An item database 114 may also be connected to the network 110. The item database 114 may be a central database used by all of the stores and distribution centers for a geographic area, such as North America, Asia, a group of states and the like. The item database 114 stores information regarding the items available for sale at the retail stores. The item database 114 may store, for each item, a database record. The database record may include an item number for the item, a UPC code, a PLU code, or other item identifying information. This information may be stored in one or more tables in the database 114.

An invoice database 116 may also be connected to the network 110. The invoice database 116 may include a database record for each order the retail stores place to the distribution centers. This information may be stored in one or more tables in the database 116. The invoice database 116 may be a central database used by all of the stores and distribution centers.

A claim processing server 120 may also be connected to the network 110. The claim processing server 120 may communication with each of the store computers 102-106, the item database 114, the invoice database 116, and the distribution computer system 112 via the network 110. A claim processing database 122 for storing information about claims may also be connected to the network 110.

In an exemplary embodiment, retail stores may use the claim processing server 120 to make a claim against a distribution center 112. Information about the claim may be entered using the store computer 102 via an application and user interface. The claims may be stored in the claims processing database 122 for processing at a later time or for batch processing, for example during off-peak hours.

The claim processing server 120 may use the input information to process the claim and validate the claim data. Using the claim information entered via the application, the claim processing server 120 may query the item database 114 and the invoice database 116 to retrieve to retrieve additional information from the databases regarding the claim and the items. The information from the different databases may be merged together into a single database record which is then validated and stored in the claim processing database 122. The information may also be checked and its accuracy verified by the claim processing server 120. The applications running at the distribution center computer 112 may then interact with the claim processing server 120 to identify the claims that have been validated.

Figure 2:
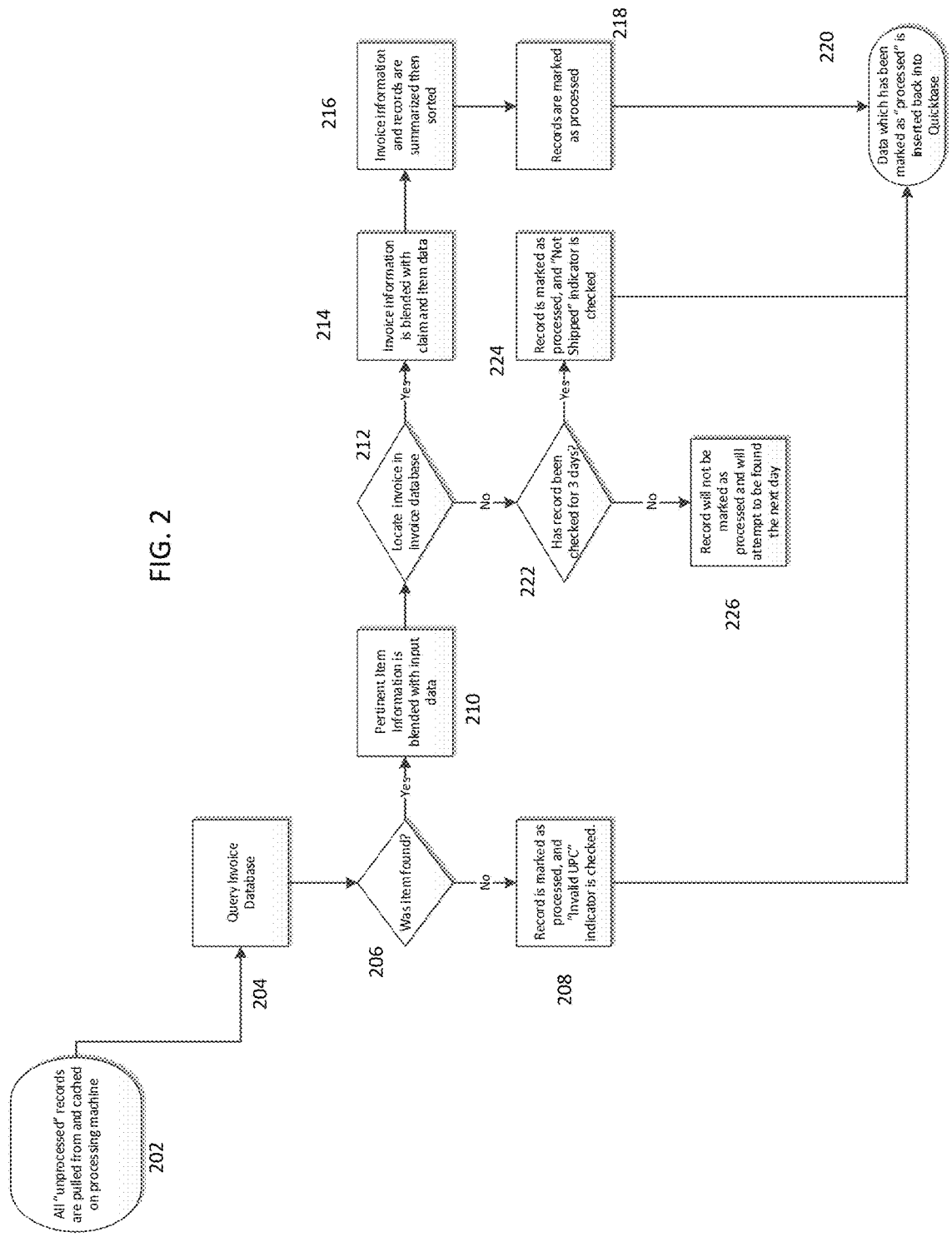
FIG. 2 illustrates an exemplary method according to an embodiment of the invention.

FIG. 2 illustrates a flowchart for a method according to an exemplary embodiment of the invention. There may be occasions when there are problems with the items delivered to the retail store from the distribution center, for example, the shipment is delayed, damaged, missing items, etc. or the items may not arrive at all. The store may file a claim against the distribution center for the item. The store computer 102-106 may be used to collect data about the items for the claims processing. Embodiments of the invention collect a minimum of information from the store and use that collected information to locate other relevant information about the order and item from the item and invoice databases 112, 114. This allows almost any employee at the retail store to initiate the claims process. In an exemplary embodiment, only two data points may be required, item identification and the issue with the order. For example, the store computer 102-106 may be used to collect identifying information regarding the item, such as a UPC code, PLU code, item number, etc. This information may be manually entered or via a bar code scanner. The scanner may scan one of the bar code for an item, cases, pallet, etc., all of which may be different for the same item. The store computer may also receive a quantity of the item, such as cases, selling units, etc. and a descriptor of the issue. The issue may be that the order was short, damaged, late, etc. The issue may be selected from a menu and based on the particular item. For example, if the item is identified as produce, the option of the item having a sell-by date that is before the delivery date may be presented, whereas this option may not be presented when the item is a television.

The system may automatically create a time/date stamp for the claim when the data for the claim is entered. In addition, the store location may also be automatically determined, for example using geolocation data. A claim record is created for processing and stored in the claims database 122. All unprocessed claims may be pulled and batched processed, step 202.

Turning to step 204, the identifying information is used to query the item database 114 to located the record for the item and retrieve additional information about the item. The query may run in a cascading fashion to match the possible different types of identifying information with a data field in database 114 until the item is located in the item database 114. Once the item is located in the item database 114, the query process stops. In one example of the cascading process, the identifying information that is collected via the store computer is the UPC code. However, as noted there are many different type of UPC codes, as well as other codes that may be collected. The system may not know that the identifying information is an item UPC code. The item database 114 is queried to determine if there is a record for an item that matches the collected identifying information. The first data field queried may be the field for the item number. The data field for item numbers in the database are matched against the scanned UPC code. As the UPC is not an item number, there would not be a match. The process may then cascade through other data fields in the item database 114 and try to match the UPC with a data field. A match should be found when the UPC data field is queried and the process may go into a temporary hold.

Figure 3:
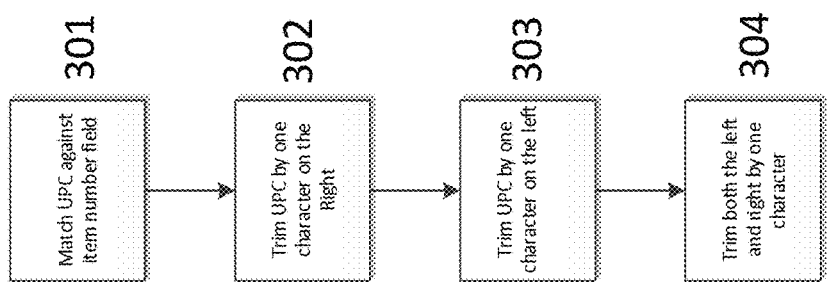
FIG. 3 illustrates an exemplary system according to an embodiment of the invention.

If the UPC submitted cannot be directly matched with a UPC from the Item File, then a sub-process shown in FIG. 3 may be performed to find the Item Information:

301) Data from UPC field is copied into Item Number field then matched against Item Number field in the item database 114. This checks to see if the an item number was keyed in rather than scanning a barcode.

302) Data in the UPC field is trimmed by 1 character on the right side then matched against the UPC field in the item database 114. This checks to see if a UPC was keyed in with an additional check-digit on the right side of the number.

303) Data in the UPC field is trimmed by 1 character on the left side then matched against the UPC field in the item database 114. This checks to see if a UPC was keyed in with an additional check-digit on the left side of the number.

304) Data in the UPC field is trimmed by 1 character on the left and right side and matched against the UPC or the Item Number field in the item database 114. This checks to see if a UPC was keyed in with both check-digits on either side of the UPC. It also checks to see if a barcode on a shelf-tag which has an Item Number field with additional check digits was scanned.

Returning to FIG. 2 and steps 206, 208, if the item is not located in the item database 114, the item may be marked as processed and an indicator set showing an invalid UPC number. The claim is then stored in the claims database 122. This information may be presented in a dashboard so that any corrections may be made to enter correct item information. A notification, such as an email, may be sent to the store submitting the claim notifying the store that no information corresponding to the claim could be located.

Per step 206, 210, if the item is found in the item database 114, the information from the item data base is blended with the information entered at the store computer. This merges the fields from item file and what was submitted by the user into one record for each item. The blended record may include what was claimed, how many items/cases from the claim processing system 120 and the item, item description, item number and other item information from the item database 114. This blended record may be stored temporarily for later use.

The claims processing system 120 in step 212 queries the invoice database 116 to locate invoice information associated with the item. The item number may be retrieved from the blended record from step 210. The item number may then be used to locate a matching record in the invoice database 116. Even if the item number was not originally entered by the user, such as in the case above where the UPC was scanned, the item number may be used as the key to search the invoice database 116. The invoice database 116 may be another database at a different location from the item database 114. In an exemplary embodiment, two tables in the invoice database 116 may be queried and concatenated. One table may store information regarding where the item was shipped, where was the item received from, when was it sent, etc. A second table may be a line table including fields for the item numbers, quantity, price, date shipped, invoice number, trailer ID, and the like.

In a further embodiment, a dynamic process executes to determine the invoice dates for querying in the invoice database 116. If the store is located in Alaska or Hawaii, the invoice search date may populate for 17 days prior to the date the record was created. This allows for added transit time for Alaska and Hawaii freight. All other stores' invoice search date may be 5 days prior to the date the record was created. Other timeframes may also be used depending on the circumstances.

Using the dynamic query, each individual record is searched against the invoice database 116 searching between the invoice search date calculated and the date the record was created. It also queries by the store which created the record and the item number which was previously identified when blending with the item file. The timeframe may be set to a predetermined time to assist in identify supply chain failures. If the missing items are not noticed within a specified time frame, it is unlikely that the issue resulted from a supply chain failure.

If no invoice within the timeframe is found, the claim may be held and checked again later to account for any time for processing invoices and for invoice database 116 to be updated. If the a matching invoice is not found, the record will not be marked as processed and another attempt to locate the invoice information will be made the next day for a selected number of days, here three days, steps 222, 226. If a matching invoice is not found after checking for the selected number of days, the record is marked as processed, and a "Not Shipped" indicator may be checked, step 224.

For those claims where an invoice is located, the invoice information located in step 212 is blended with the one data record for the item from step 210, resulting in a single record for the item. Invoice information and records may be summarized then sorted, step 216. The system may sums the invoice lines for each day shipped. It then takes the maximum shipment (by day) and attaches all of the other pertinent invoice information. It is then marked as processed, merged with all of the other records, and updated into the claims database. The records are marked as processed, step 218. A user at the distribution center may log in to the system and request the claims against the distribution center. The system may retrieve those records marked as processed from the claims database 122. Those records may be shown on a dashboard on the distribution center computer 112.

Figure 4:
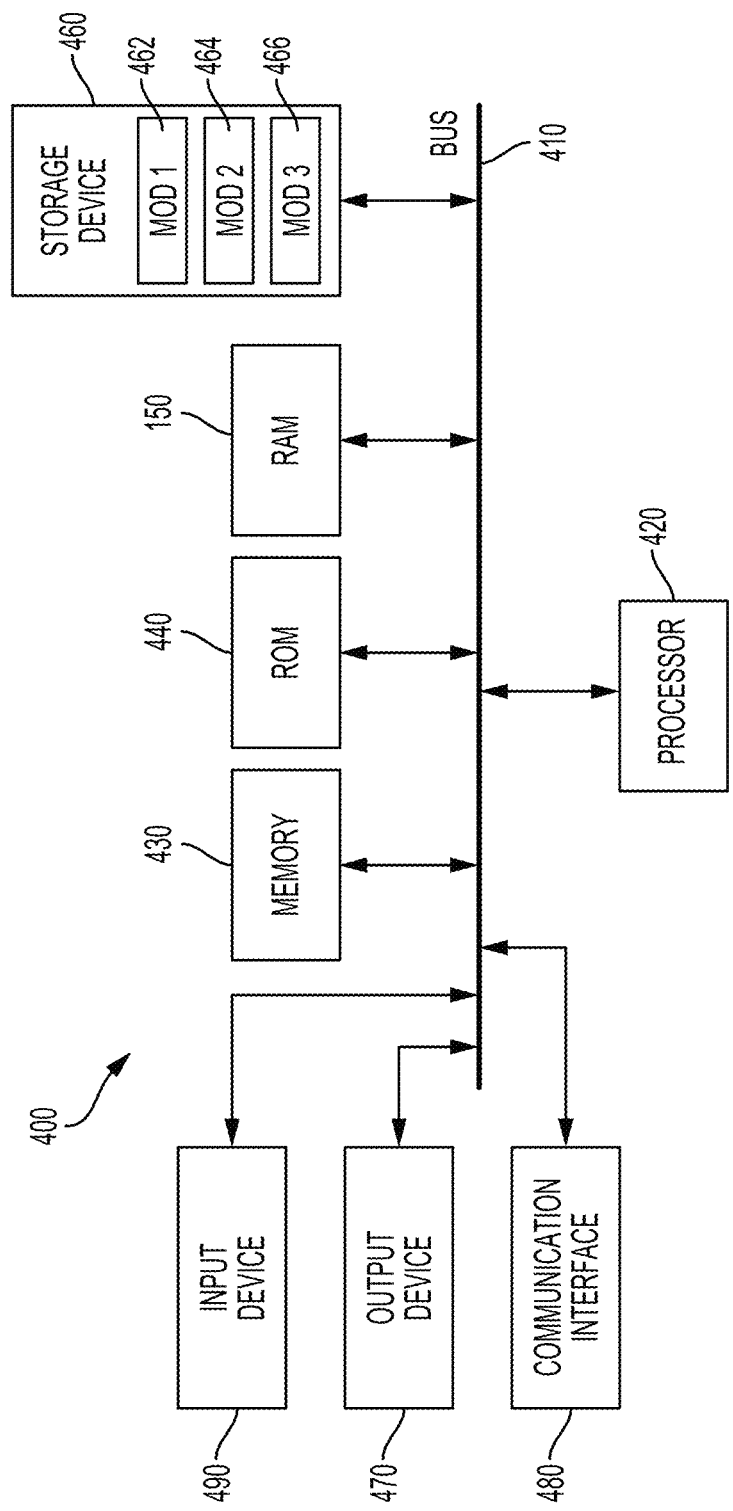
FIG. 4 illustrates an example computing system.

With reference FIG. 4, which illustrates an exemplary system 400 used in performing the method includes a general-purpose computing device 400, including a processing unit (CPU or processor) 420 and a system bus 410 that couples various system components including the system memory 430 such as read only memory (ROM) 440 and random access memory (RAM) 450 to the processor 420. The system 400 can include a cache 422 of high speed memory connected directly with, in close proximity to, or integrated as part of the processor 420. The system 400 copies data from the memory 430 and/or the storage device 460 to the cache 422 for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as Mod1 462, Mod2 464, and Mod3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
 receiving via a user application at a store computer claim information including item identifying information;
 querying an item database to locate item information corresponding to the item identifying information;
 merging the item identifying information with the item information from the item database to obtain first merged data;
 temporarily storing the first merged data;
 determining an item number from the first merged data;
 querying an invoice database to retrieve invoice information corresponding to the item number;
 merging the invoice information with the first merged data to obtain second merged data;
 storing the second merged data as a single record for the item in a claims database;
 determining a search timeframe for the invoice database;
 searching the invoice database within the search timeframe;
 requerying the invoice database periodically based on the search timeframe; and
 determining that the item was not shipped when the invoice is not found.

2. The method of claim 1, further comprising:
 presenting the second merged data to a user via a user dashboard at a distribution center computer.

3. The method of claim 1, wherein the item identifying information comprises one of a UPC code, an item number and a PLU code.

4. The method of claim 1, wherein the invoice information includes at least one of the item number, quantity, price, date shipped, invoice number, and trailer ID.

5. The method of claim 1, wherein querying the item database comprises:
 querying the item identifying information against data files in the item database for an item number, UPC code, or PLU until a match is found; and
 ending the query once the match is found.

6. The method of claim 5, further comprising:
 deleting one character on a right side of the item identifying information to obtain modified item identifying information; and
 matching the modified item identifying information against the UPC field in the item database.

7. The method of claim 5, further comprising:
 deleting one character on a left side of the item identifying information to obtain modified item identifying information; and
 matching the modified item identifying information against the UPC field in the item database.

8. The method of claim 5, further comprising:
 deleting one character on the right side and the left side of the item identifying information to obtain modified item identifying information; and
 matching the modified item identifying information against the UPC field in the item database.

9. The method of claim 1, further comprising receiving via a user application an item quantity and an item impact.

10. A method comprising:
 receiving via a user application at a store computer claim information including item identifying information, an impact and a quantity;
 automatically creating a time/date stamp for the claim information;
 automatically determining a location for the claim information;
 creating a claim record in a claim database, the claim record including the item identifying information, the impact, the quantity, the time/date stamp and the location;
 querying an item database to locate item information corresponding to the item identifying information;
 merging the claim record with the item information from the item database to obtain first merged data;
 determining an item number from the merged data;
 querying an invoice database to locate invoice information corresponding to the item number;
 retrieving the invoice information from the invoice database;
 notifying store when the invoice information is not found;
 merging the invoice information with the first merged data into one data record;
 storing the data record in a database;
 determining a search timeframe for the invoice database;

searching the invoice database within the search timeframe;
requerying the invoice database periodically based on the search timeframe; and
determining that the item was not shipped when the invoice is not found.

11. The method of claim 10, wherein the timeframe is five days prior to the date in the time/date stamp.

12. The method of claim 10, further comprising storing a plurality of claim records in the claims database and batch processing the claim records.

13. The method of claim 10, where the item database stores the item, item description, and item number.

14. A system, comprising:
an item database storing an item record including an item, item description, item number;
an invoice database storing an invoice record including item number, quantity, price, date shipped, invoice number, and trailer ID;
a store computer having a store user application;
distribution center computer having a user application;
a server; and
the claims database, the item database, the invoice database, the store computer, the distribution center computer, and the server connected to a network,
the server:
  receiving via a user application claim information including item identifying information;
  querying the item database to locate item information corresponding to the item identifying information;
  merging the item identifying information with the item information from the item database to obtain first merged data;
  temporarily storing the merged data;
  determining an item number from the merged information;
  querying the invoice database to retrieve invoice information corresponding to the item number;
  merging the invoice information with the first merged data to obtain second merged data; and
  storing the second merged data as a single record for the item in a claims database;
determining a search timeframe for the invoice database;
searching the invoice database within the search timeframe;
requerying the invoice database periodically based on the search timeframe;
determining that the item was not shipped when the invoice is not found; and
the distribution center computer presenting the single data record on a display.

15. The system of claim 14, further comprising:
presenting the second merged data to a user via a user dashboard.

16. The system of claim 14, wherein the item identifying information comprises one of a UPC code, an item number and a PLU code.

17. The system of claim 14, wherein the invoice information includes at least one of the item number, quantity, price, date shipped, invoice number, and trailer ID.

18. The system of claim 14, wherein querying the item database comprises:
querying the item identifying information against data files in the item database for item number UPC code and PLU until a match is found; and
ending the query once the match is found.

* * * * *